(12) United States Patent
Sa et al.

(10) Patent No.: US 11,513,621 B2
(45) Date of Patent: Nov. 29, 2022

(54) DISPLAY APPARATUS

(71) Applicant: LG Electronics Inc., Seoul (KR)

(72) Inventors: Jaecheon Sa, Seoul (KR); Dongkill Yu, Seoul (KR); Yongseop Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/734,137

(22) PCT Filed: Jun. 1, 2018

(86) PCT No.: PCT/KR2018/006267
§ 371 (c)(1),
(2) Date: Dec. 1, 2020

(87) PCT Pub. No.: WO2019/231026
PCT Pub. Date: Dec. 5, 2019

(65) Prior Publication Data
US 2021/0216154 A1 Jul. 15, 2021

(51) Int. Cl.
*G06F 3/041* (2006.01)
*G06F 1/16* (2006.01)
(Continued)

(52) U.S. Cl.
CPC ............ *G06F 3/0412* (2013.01); *B60K 35/00* (2013.01); *G06F 1/1601* (2013.01); *G06F 3/016* (2013.01); *B60K 2370/1438* (2019.05); *B60K 2370/158* (2019.05); *G01L 1/22* (2013.01); *G02F 1/133314* (2021.01); *G02F 1/133317* (2021.01); *G02F 1/133322* (2021.01); *G06F 1/1637* (2013.01); *G06F 3/04142* (2019.05); *G06F 2203/04103* (2013.01); *G06F 2203/04105* (2013.01)

(58) Field of Classification Search
CPC ...... G06F 3/0412; G06F 1/1601; G06F 3/016; G06F 2203/04105; G06F 2203/04103; G06F 3/04142; G06F 1/1637; G06F 1/1643; G06F 3/041; B60K 35/00; B60K 2370/158; B60K 2370/1438; G02F 1/133322; G02F 1/133314; G02F 1/133317; H01L 51/5237; G01L 1/22
See application file for complete search history.

(56) References Cited

U.S. PATENT DOCUMENTS

| | | | | |
|---|---|---|---|---|
| 5,038,142 A | * | 8/1991 | Flower | ................ G06F 3/04142 345/173 |
| 5,327,164 A | * | 7/1994 | Fagard | .................. G06F 3/0444 345/174 |

(Continued)

FOREIGN PATENT DOCUMENTS

JP 2019194833 A * 11/2019

*Primary Examiner* — Douglas M Wilson
(74) *Attorney, Agent, or Firm* — Fish & Richardson P.C.

(57) ABSTRACT

A display apparatus includes: a display panel, a guide panel coupled to a rear surface of the display panel, a main frame coupled to the guide panel, and a force sensor module disposed between the guide panel and the main frame. The force sensor module includes: a sensor bar including one or more sensor rods, the one or more sensor rods extending from a central portion of the main frame toward a peripheral portion of the main frame, and a strain gauge provided at each of the one or more sensor rods.

19 Claims, 9 Drawing Sheets

(51) Int. Cl.
*G06F 3/01* (2006.01)
*G02F 1/1333* (2006.01)
*G01L 1/22* (2006.01)
*B60K 35/00* (2006.01)

(56) References Cited

U.S. PATENT DOCUMENTS

| | | | |
|---|---|---|---|
| 2012/0040721 A1* | 2/2012 | Infanti | G06F 3/016 345/173 |
| 2015/0116260 A1* | 4/2015 | Hoen | G06F 3/03547 345/174 |
| 2015/0177899 A1* | 6/2015 | Degner | G06F 3/03547 345/174 |
| 2016/0216842 A1* | 7/2016 | Mölne | G06F 3/044 |
| 2019/0332176 A1* | 10/2019 | Yang | G06F 3/016 |

* cited by examiner

DISPLAY APPARATUS

CROSS-REFERENCE TO RELATED APPLICATIONS

This application is a National Stage application under 35 U.S.C. § 371 of International Application No. PCT/KR2018/006267, filed on Jun. 1, 2018. The disclosure of the prior application is incorporated by reference in its entirety.

TECHNICAL FIELD

The present disclosure relates to a display apparatus, and more particularly, to a display apparatus that senses a pressure, applied to a display panel by a user's touch, using a force sensor.

BACKGROUND ART

Recently, a display apparatus is installed even in a vehicle, and a user operates the display apparatus using a touch sensor or a force sensor.

Since a force sensor according to a related art is disposed in several layers behind the display module, there are problems that the force sensor has a complicated structure and increases a thickness of the display apparatus.

Korean Patent Application Publication No. 10-2010-0129420 discloses a display apparatus having a pressure sensor that senses a touch pressure by measuring deformation of a metal resistance layer on the side of a free end of the force sensor so that a force sensor module can be slim.

However, the related art has problems in that it is not possible to uniformly sense a pressure of a user's touch pressure regardless of a position of the user's touch because the force sensor is disposed at an edge of the display and that a large number of force sensors are required.

In addition, the related art has a problem in that it is difficult to accurately install a force sensor at a predetermined design position.

In addition, the related art has a problem in that the force sensor cannot operate accurately due to fatigue during long-term use.

DISCLOSURE

Technical Problem

It is a first object of the present disclosure to provide a display apparatus capable of uniformly sensing a user's touch pressure regardless of a position at which a user's touch is applied on a display.

It is a second object of the present disclosure to provide a display apparatus capable of accurately detecting a pressure of a user's touch with a small number of force sensors.

It is a third object of the present disclosure to provide a display apparatus capable of simply and accurately installing a force sensor at a predetermined design position.

The objects of the present disclosure are not limited to the above-mentioned object, and other objects that have not been mentioned above will become evident to those skilled in the art from the following description.

Technical Solution

In accordance with an aspect of the present disclosure, the above objects can be accomplished by the provision of a display apparatus including a display panel; a guide panel coupled to a rear surface of the display panel; a main frame coupled to the guide panel; and a force sensor module located between the guide panel and the main frame, wherein the force sensor module comprises: a sensor bar including a sensor rod disposed to be inclined from a central portion of the main frame toward a peripheral portion of the main frame; and a strain gauge installed on each of the plurality of sensor rods.

The sensor bar may be symmetrically disposed to each other in up-downward direction and a left-rightward direction.

Each of the sensor bar may be disposed in a diagonal direction of the main frame.

The sensor bar may include a stem rod, and the sensor rod may extend outwardly from both ends of the stem rod.

The stem rod may be disposed in a vertical or horizontal direction of the main frame.

The sensor bar may be a pair of sensor bars disposed to be vertically and horizontally symmetrical to each other.

A stem recession into which the stem rod is inserted may be formed in the main frame.

A guide hole may be formed in one of the stem rod and the main frame, and a protrusion to be inserted into the guide hole is formed in the other one of the stem rod and the main frame.

An inner end of the sensor rod may be fixed to the main frame, and an outer end of the sensor rod may be disposed to be spaced apart from a bottom surface of the main frame so as to be movable toward the main frame.

The outer end of the sensor rod may be fixed to the guide panel.

The guide panel may have a boss protruding rearward, and the outer end of the sensor rod is fixed to the boss.

The main frame may have an opening formed at a position corresponding to the outer end of the sensor rod, so that a fastening member passes through the opening and is then fastened to the sensor rod and the boss.

Specific details of other embodiments are included in the detailed description and drawings.

Advantageous Effects

According to the present disclosure, there are one or more effects as below.

First, since sensor rods included in a force sensor module are disposed to be inclined from the center toward the periphery of a main frame, it is possible to reduce deviation in detected pressure according to a position which a user touches on a display panel.

Second, as the sensor rods are integrated using stem rods, it is possible to efficiently sense a pressure of the user's touch with a minimum number of members.

Third, it is possible to simply and tightly fasten the sensor bars at predetermined positions on the frame using guide holes and protrusions.

Effects of the present disclosure should not be limited to the aforementioned effects and other unmentioned effects will be clearly understood by those skilled in the art from the claims.

MODE FOR INVENTION

Hereinafter, examples disclosed in the present specification will be described in detail with reference to the accompanying drawings, the same reference numerals are given to the same or similar constituent elements irrespective of the drawing signs, and the repeated description thereof will be omitted. In the following description, with respect to constituent elements used in the following description, the suffixes "module" and "unit" are used or combined with each other only in consideration of ease in the preparation of the specification, and do not have or serve as different meanings. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

A vehicle described in the present specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

Figure 1:
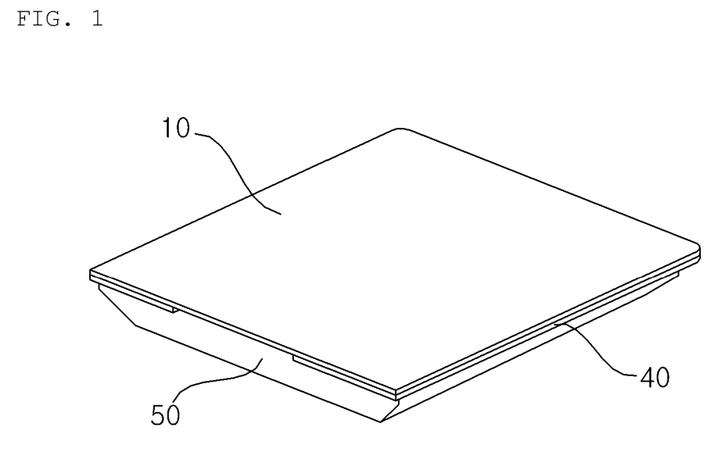
FIG. 1 is a perspective view of a display apparatus according to an embodiment of the present disclosure.
Figure 2:
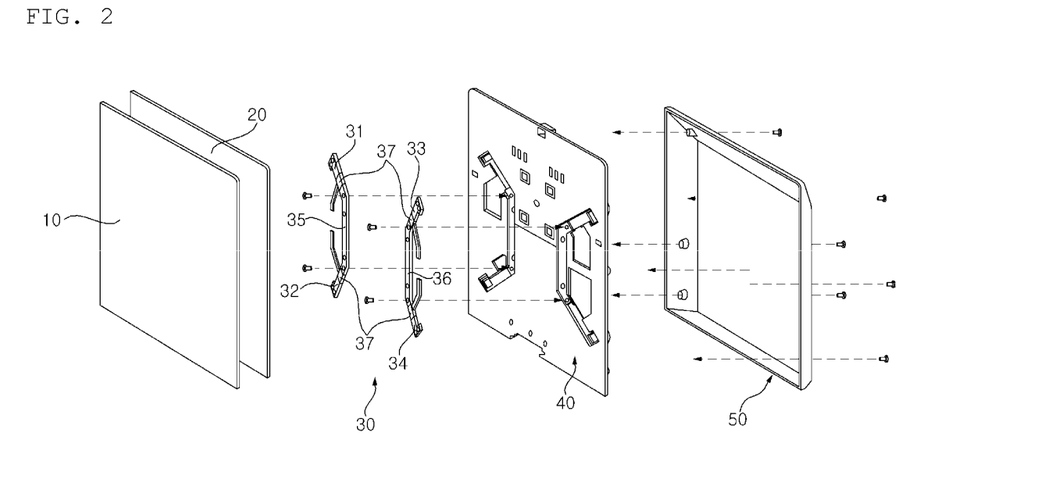
FIG. 2 is an exploded perspective view of a display apparatus according to an embodiment of the present disclosure.
Figure 3:
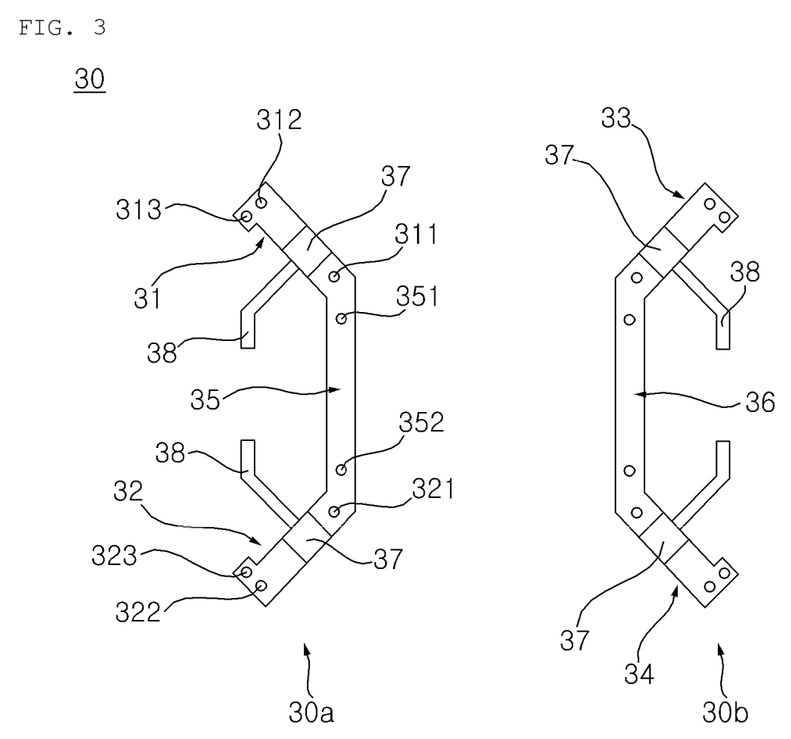
FIG. 3 is a front view of a sensor bar according to an embodiment of the present disclosure.
Figure 4:
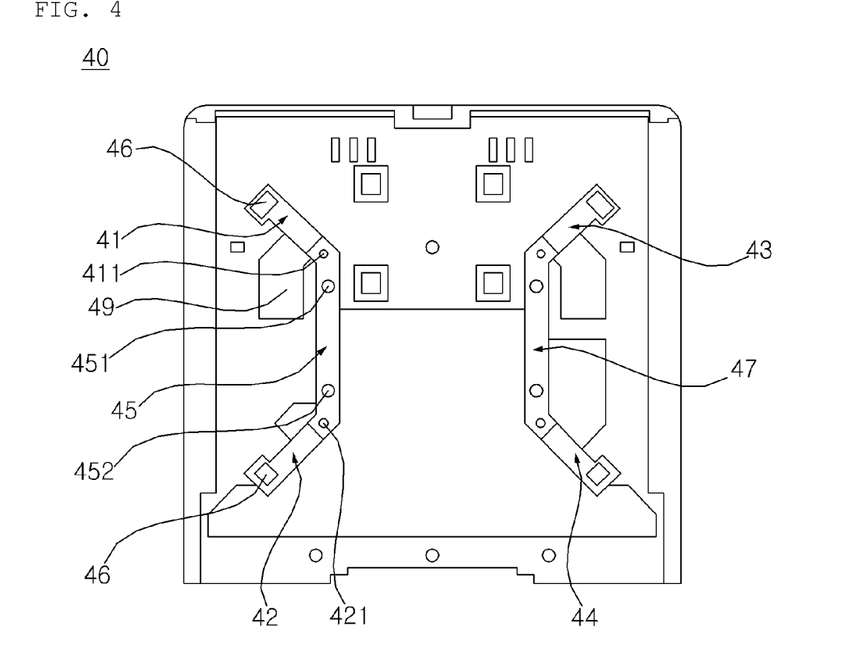
FIG. 4 is a front view of a main frame according to an embodiment of the present disclosure.
Figure 5:
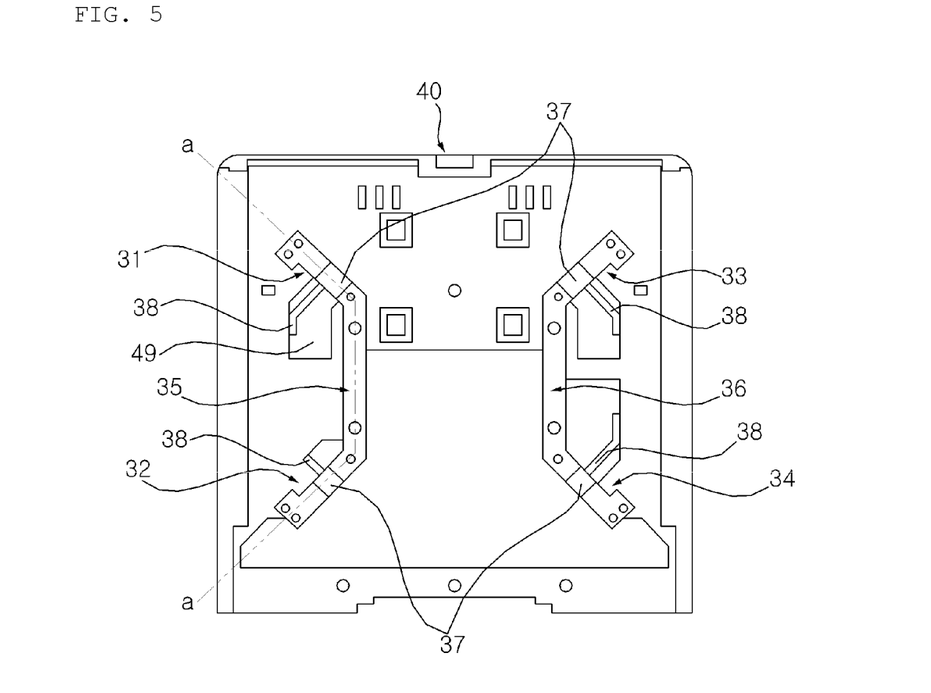
FIG. 5 is a front view of a main frame to which a sensor bar according to an embodiment of the present disclosure is coupled.
Figure 6:
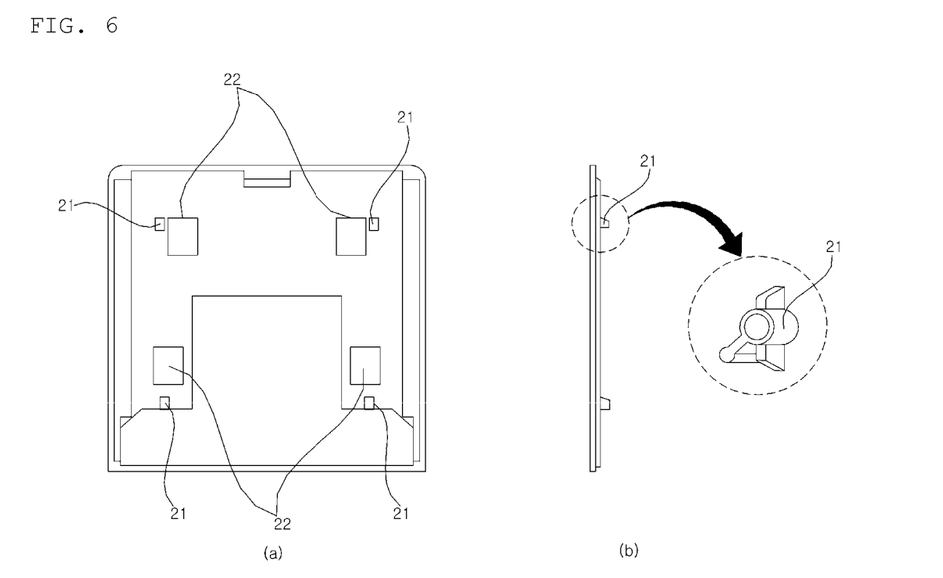
FIG. 6 is a rear view and a side view of a guide panel according to an embodiment of the present disclosure.
Figure 7:
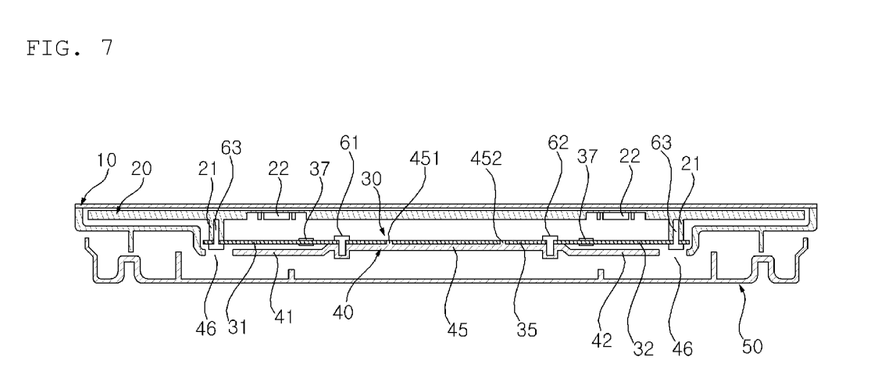
FIG. 7 is a sectional view taken along line a-a in FIG. 5.

FIG. 1 is a perspective view of a display apparatus according to an embodiment of the present disclosure. FIG. 2 is an exploded perspective view of a display apparatus according to an embodiment of the present disclosure. FIG. 3 is a front view of a sensor bar according to an embodiment of the present disclosure. FIG. 4 is a front view of a main frame according to an embodiment of the present disclosure. FIG. 5 is a front view of a main frame to which a sensor bar according to an embodiment of the present disclosure is coupled. FIG. 6 is a rear view and a side view of a guide panel according to an embodiment of the present disclosure. FIG. 7 is a sectional view taken along line a-a in FIG. 5.

A display apparatus according to a first embodiment of the present disclosure will be described below with reference to FIGS. 1 to 7.

The display apparatus according to the first embodiment of the present disclosure may be provided inside a vehicle. The display apparatus may include a display module comprised of a display panel 10 and a guide panel 20, a main frame 40 coupled to a rear surface of the display module, a back cover 50, and a force sensor module 30 located between the guide panel 20 and the main frame 40 to sense a pressure applied to the display panel 10 by a user's touch.

The display panel 10 may include an Organic Light-Emitting Diode (OLED) or a Liquid Crystal Display (LCD).

The display panel 10 may include a touch screen (not shown). In this case, the pressure applied to the display panel 10 by the user's touch may be converted into an electrical signal and provided to a processor mounted on a printed circuit board (PCB) electrically connected to the touch screen.

The display panel 10 may be covered by a cover glass (not shown).

The cover glass may be directly touched by the user. The cover glass may be formed of a transparent material and may have a predetermined thickness.

As shown in FIG. 2, the guide panel 20 may be located at the rear surface of the display panel 10.

As shown in FIG. 6, the guide panel 20 may be formed in a rectangular shape.

In this case, the guide panel 20 not only provides a space in which a boss 21 and a haptic module 22 to be described later can be mounted, but also has an advantageous effect in preventing damage to the display panel 10 from an external impact. However, the shape of the guide panel 20 is not limited thereto.

The guide panel 20 may be coupled to the display panel 10, which includes OLEDs, by using an Optically Clear Adhesive (OCA) as a medium.

The guide panel 20 may be coupled to the display panel 10, which includes LCDs, by using an Optically Clear Resin (OCR) as a medium.

As shown in FIG. 6, the guide panel 20 may include the boss 21 and the haptic module 22.

The boss 21 may be formed to protrude rearward of the guide panel 20.

At least one boss 21 may be located at a rear surface of the guide panel 20.

The boss 21 may have a threaded line formed in an inner circumferential surface. In this case, an outer end of a first sensor rod 31, 32 which will be described later may be fixed to the boss 21.

At least one haptic module 22 may be located at the rear surface of the guide panel 20.

The haptic module 22 may include a haptic actuator (not shown).

The haptic actuator may provide haptic effects to the display panel 10 based on an electrical signal corresponding to a pressure applied to the display panel 10 by a user's touch.

For example, the pressure applied to the display panel 10 by the user's touch may be converted into an electrical signal and then provided to a processor mounted on a PCB electrically connected to the haptic module 22.

In this case, the haptic module 22 may provide haptic effects to the display panel 10 by a haptic actuator based on the electrical signal provided to the processor.

Meanwhile, the haptic module 22 may be located so as not to overlap more than one area with a sensor bar 30*a*, 30*b* which will be described later.

This is to prevent the haptic effects provided by the haptic module 22 from affecting force detection of a strain gauge 37 due to deformation of the sensor bar 30*a*, 30*b*.

Referring to FIGS. 2 and 7, the force sensor module 30 may be located between the guide panel 20 and the main frame 40 which will be described later.

The force sensor module 30 may sense a pressure applied to the display panel 10 by the user's touch.

Referring to FIGS. 2, 3, and 7, the force sensor module 30 may include two sensor bars 30*a*, 30*b* provided with sensor rods 31, 32, 33, 34 disposed to be inclined from the central portion toward the edge of the main frame 40, and four strain gages 37 respectively installed at the sensor rods 31, 32, 33, 34.

The sensor bars 30*a*, 30*b* may be formed of a metal material, particularly aluminum (Al). However, the material of the sensor bars 30*a*, 30*b* is not limited thereto.

The sensor bars 30*a*, 30*b* may include a first sensor bar 30*a* and a second sensor bar 30*b*, which are spaced apart from each other on the left and right sides.

A description about the first sensor bar 30*a* located on a left side will be given as an example. The first sensor bar 30*a* may include a first upper sensor rod 31 located on an upper side, a first lower sensor rod 32 located on a lower side, and a first stem rod 35 connecting the first upper and lower sensor rods 31, 32 in a vertical direction.

Here, the first stem rod 35 may serve to connect and integrate the first upper and lower sensor rods 31, 32 spaced apart from each other and disposed to be vertically symmetrical to each other. As a result, it may be advantageous in management and positioning adjustment of the first sensor bar 30*a*.

In other words, due to the integration of the first sensor bar 30*a* by use of the first stem rod 35, it is possible to efficiently sense a pressure of a user's touch with a minimum number of members.

In this case, the first upper sensor rod 31 may be formed to extend to be inclined in a left-upward direction from an upper end of the first stem rod 35, and the first lower sensor rod 32 may be formed to extend to be inclined in a left-downward direction from a lower end of the first stem rod 35.

That is, a line connecting an inner end and an outer end of each of the first upper and lower sensor rods 31, 32 may not be parallel to the horizontal and vertical directions of the main frame 40.

In this case, the angle formed between each of the first upper and lower sensor rods 31, 32 and the first stem rod 35 may be 100° to 150°, and hence, the first sensor bar 30*a* may be formed in the shape of "D", as shown in FIG. 3.

However, the directions in which the first upper and lower sensor rods 31, 32 extend may vary according to a horizontal or vertical width of the main frame 40.

In this case, the first upper and lower sensor rods 31, 32 are preferably formed to be vertically symmetrical to each other with respect to a horizontal line passing through the central portion of the first stem rod 35.

Likewise, the second sensor bar 30*b* located on the right side may also include second upper and lower sensor rods 33 and 34 and a second stem rod 36.

As a result, compared to a case where the sensor rods 31, 32, 33, 34 are located parallel to a longitudinal or transverse direction of the main frame 40, it may be advantageous in precisely measuring deformation of the sensor rods 31, 32, 33, 34 caused by a pressure applied to the display panel 10 by the user's touch.

That is, since the sensor rods 31, 32, 33, 34 are located to be inclined in the horizontal and vertical directions of the main frame 40, the strain gage 37 which will be described later may be able to uniformly measure a pressure applied to the display panel 10 by the user's touch.

As a result, it is possible to measure a pressure at a position where the user's touch is applied on the display panel 10 and reduce deviation of haptic effects based on the measured pressure.

Referring to FIGS. 3 and 7, the first sensor bar 30*a* will be described in more detail. A guide hole 351, 352 may be formed at both ends of the first stem rod 35, respectively.

In addition, the first upper and lower sensor rods 31, 32 may each have a first fastening hole 311, 312 formed at an inner end and a second fastening hole 312, 322 formed at an outer ends.

In addition, a third fastening hole 313, 323 may be formed in a bent portion protruding from the outer end to the central portion of the first upper and lower sensor rods 31, 32.

The guide hole 351, 352, the first fastening hole 311, 312, the second fastening hole 312, 322, and the third fastening hole 313, 323 will be described later.

The strain gauge 37 may sense a pressure applied to the display panel 10 and the guide panel 20 by a user's touch.

Specifically, the strain gauge 37 may sense a pressure applied to the sensor rod 31, 32, 33, 34 by measuring a change in electrical resistance caused by deformation of the sensor rod 31, 32, 33, 34.

Therefore, the strain gauge 37 is preferably located at a position where deformation (rate) of the sensor rod 31, 32, 33, 34 is great.

The strain gauge 37 may be located at the sensor rod 31, 32, 33, 34.

The strain gauge 37 may include a signal transmitter 38. The strain gauge 37 may be connected to a PCB panel located at the main frame 40 through the signal transmitter 38.

That is, the signal transmitter 38 may transmit an input value, sensed by the strain gauge 37, to the PCB panel located at the main frame 40.

The signal transmitter 38 may be configured as a flexible printed circuit board (FPCB).

The signal transmitter 38 may have at least one bent portion.

The angle at which the signal transmitter 38 is bent may vary depending on a position of the strain gage 37 on the sensor rod 31, 32, 33, 34 and a position of a connecting terminal on the PCB panel, to which the signal transmitter 38 is connected.

The main frame 40 at which the sensor bar 30a, 30b is installed will be described with reference to FIGS. 4, 5 and 7 as follows.

A first stem recession 45 may be formed in a vertical direction in a way to be recessed rearward from a front surface of the main frame 40, so that the first stem rod 35 can be inserted into the first stem recession 45 and placed therein.

In addition, a first upper recession 41 may be formed in a left-upward direction from an upper end of the first stem recession 45, a first lower recession 41 may be formed in a left-downward direction from a lower end of the first stem recession 42, and thus, the first upper and lower sensor rods 31, 32 may be inserted into the first upper and lower recessions 41, 42.

In this case, the first upper and lower recessions 41, 42 may include portions into which inner ends of the first upper and lower sensor rods 31, 32 are inserted and placed, and portions into which the outer ends of the first upper and lower sensor rods 31, 32 are inserted.

Portions of the first upper and lower recessions 41, 42 into which the inner ends of the first upper and lower sensor rods 31, 32 are inserted and placed may be formed to be recessed rearward from the front surface of the main frame 40 by the same depth of the first stem recession 45.

However, other portions of the first upper and lower recessions 41, 42, other than the portions into which the inner ends of the first upper and lower sensor rods 31, 32 are inserted and placed, may be formed to be recessed further rearward from the front surface of the main frame 40 than the first stem recession 45.

As a result, a rear surface of the first stem rod 35 may be placed on the first stem recession 45 to contact a bottom surface of the first stem recession 45, and rear surfaces of the inner ends of the first upper and lower sensor rods 31, 32 may be placed to contact the bottom surfaces of the portions of the first and lower recessions 41, 42, the portions into which the inner ends of the first upper and lower sensor rods 31, 32 are inserted.

However, rear surfaces of portions other than the inner ends of the first upper and lower sensor rods 31, 32 may be spaced a predetermined distance apart from the bottom surfaces of the portions of the first upper and lower recessions 41, 42 into which the inner ends of the first upper and lower sensor rods 31, 32 are inserted and placed, and thus, the rear surfaces of the other portions of the first upper and lower sensor rods 31, 32 may move the predetermined distance rearward.

In this case, the distance by which the first upper and lower sensor rods 31, 32 are spaced apart from the bottom surfaces of the first upper and lower recessions 41, 42 may be about 1 mm, but the separation distance is not limited thereto and may vary depending on a thickness or a deformation range of the first upper and lower sensor rods 31, 32.

Further, the recession may prevent the sensor bar 30a, 30b from being out of a fixed position thereof after the sensor bar 30a, 30b is fixed to the main frame 40.

Meanwhile, in the first stem recession 45, first and second protrusions 451, 452 may be formed at positions corresponding to first and second guide holes 351, 352 formed in the first stem rod 35.

In addition, in the first upper and lower recessions 41, 42, a first fastening aperture 411 and 421 may be formed at a position corresponding to the first fastening hole 311, 321 formed in the first upper and lower sensor rods 31, 32.

Accordingly, in the case of installing the first sensor bar 30a on the main frame 40, if the first sensor bar 30a is inserted into the first stem recession 45 and the first upper and lower recessions 41, 42 of the main frame 40 in order to allow the first and second protrusions 451, 452 to be inserted into the first and second protrusions 451, 452, the first fastening hole 311, 321 and the first fastening aperture 411, 421 may be matched.

When a first upper set screw 61 is screwed into a first upper fastening hole 311 and a first upper fastening aperture 411, which are matched with each other, and a first lower set screw 62 is screwed into a first lower fastening hole 321 and a first lower fastening aperture 421, which are matched with each other, the first sensor bar 30a may be fixedly installed on the main frame 40.

Accordingly, the first sensor bar 30a may be simply and tightly coupled at a predetermined position on the main frame 40. In addition, when the sensor bar 30a, 30b is coupled to the main frame 40, the third fastening hole 313 may also serve to allow the sensor bar 30a, 30b to be simply and tightly fastened at the predetermined position on the main frame 40.

Meanwhile, in the main frame 40, a second stem recession 47 and second upper and lower recessions 43, 44 may be formed to correspond to the second sensor bar 30b, and the second sensor bar 30b may be also inserted into the aforementioned recession to be fixedly installed on the main frame 40, and the specific coupling structure and coupling method thereof are the same as those of the first sensor bar 30a, and thus a further description will be omitted.

Reference numeral 46 indicates an opening formed at a position on the main frame 40, which corresponds to the second fastening hole 312, 322 formed at the outer end of the first upper and lower sensor rods 31, 32, and the function of the opening will be described later.

Reference numeral 49 indicates a cutout formed in the main frame 40, so that the signal transmitter 38 can be disposed therein.

Meanwhile, the guide panel 20 of the display module may have a boss 21 protruding from a rear surface thereof, as shown in FIG. 6, and the boss 21 may be formed at a position corresponding to a second fastening hole 312, 322 of the first sensor rods 31, 32.

When the second set screw 63 is screwed through the aforementioned opening 46 of the main frame 40 into the boss 21 and second fastening holes 312, 322 formed at the outer ends of the first sensor rods 31, 32, the outer ends of the first sensor rods 31, 32 may be fixed to the guide panel 20.

As a result, a pressure applied to the display panel 10 and the guide panel 20 by a user's touch may be transmitted to the sensor rod 31, 32 through the boss 21.

In other words, a pressure of the user's touch transmitted to the first sensor rods 31, 32 may induce deformation from the outer end to the inner end of each of the first sensor rod 31, 32.

Accordingly, the strain gauge 37 may be located between the inner end and the outer end of each of the first sensor rods 31, 32.

Specifically, a strain gauge 37 located at the first upper sensor rod 31 may be located between the first upper fastening hole 311 and the second upper fastening hole 312, and a strain gauge 37 located at the second lower sensor rod 32 may be located between the first lower fastening hole 321 and the second lower fastening hole 322.

Meanwhile, since the inner end of the first sensor rod 31, 32 is coupled to the main frame 40 through the first fastening hole 311, 321, a user's touch input transmitted through the outer end of the first sensor rod 31, 32 may increase in deformation (or a deformation rate) as the user's touch input is closer to the inner end of the first sensor rod 31, 32.

Therefore, it is preferable that the strain gauge 37 for detecting deformation (or a deformation rate) of the first sensor rod 31, 32 is located closer to the inner end than the outer end of the first sensor rods3l, 32.

Meanwhile, as the first sensor rod 31, 32 is coupled to the main frame 40 through the first fastening hole 311, 321 formed at the inner end and to the guide panel 20 through the second fastening hole 312, 322 formed at the outer end, the guide panel 20 and the main frame 40 may be coupled to each other by using the first sensor rods 31, 32 as a medium.

In the display apparatus according to the first embodiment of the present disclosure configured as described above, the sensor rod 31, 32 is formed at both ends of the stem rod 35 of the first sensor bar 30a located on the left side and the sensor rod 33, 34 is formed at both ends of the stem rod 36 of the second sensor bar 30b located on the right side, and thus, it is possible to sense a pressure applied to the display panel 10 by a user's touch with a small number of the sensor bar 30a, 30b.

In addition, since the sensor rod 31, 32, 33, 34 is disposed to be inclined from the center toward the edge of the main frame 40 and disposed to be vertically and horizontally symmetrical to another sensor rod, it is possible to accurately sense a pressure applied to the display panel 10 by a user's touch.

In addition, since the outer end of the sensor rod 31, 32, 33, 34 is fixed to the guide panel 20, it is possible to more accurately sense a pressure applied to the display panel 10 by the user's touch and to prevent noise possibly generated when the sensor rod 31, 32, 33, 34 collides with the guide panel 20 while in use.

In addition, a recession for accommodating the sensor bar 30a, 30b is formed in the main frame 40, and the guide hole and the protrusion are formed to allow the sensor bar 30a, 30b and the main frame 40 to be coupled before the sensor bar 30a, 30b is fastened to the main frame 40, and therefore, the sensor bar 30a, 30b may be simply and tightly fastened at a predetermined position on the main frame 40.

In addition, when a sensor rod includes a free end, there may be a problem that the free end does not return to its original position and remains deformed. However, the sensor rods 31, 32, 33 and 34 of the present disclosure are configured such that both ends of each sensor rod is provided as fixed ends, and thus, it is possible to prevent reduction of a force sensing rate caused by change of initial design positions of the sensor rods 31, 32, 33, and 34.

Meanwhile, the sensor bars 30a, 30b according to the first embodiment of the present disclosure has been described that the sensor bars 30a, 30b are disposed to be horizontally symmetrical to each other with respect to a vertical central axis of the main frame 40 as the stem rod 35, 36 extends in a vertical direction of the main frame 40. However, the stem rod 35, 36 may be also disposed to extend in a horizontal direciton of the main frame 40.

In addition, a structure in which the first and second guide holes 351, 352 are formed in the first stem rod 35 and the first and second protrusions 451, 452 inserted into the guide hole are formed in the main frame 40 has been described as an example. Conversely, however, the first and second guide holes 351, 352 may be formed in the main frame 40, the first and second protrusions may be formed in the stem rod 35, and the guide holes and the protrusions may be formed in singular.

Referring to FIG. 2, the display apparatus according to the first embodiment of the present disclosure may further include a back cover 50.

The back cover 50 may be coupled to the main frame 40.

The back cover 50 may serve to cover a component mounted on the main frame 40.

The display apparatus according to the first embodiment of the present disclosure may further include a fan (not shown).

The fan may be electrically connected to a PCB embedded in the display apparatus.

The fan may cool components included in the display apparatus, including the display panel 10.

Figure 8:
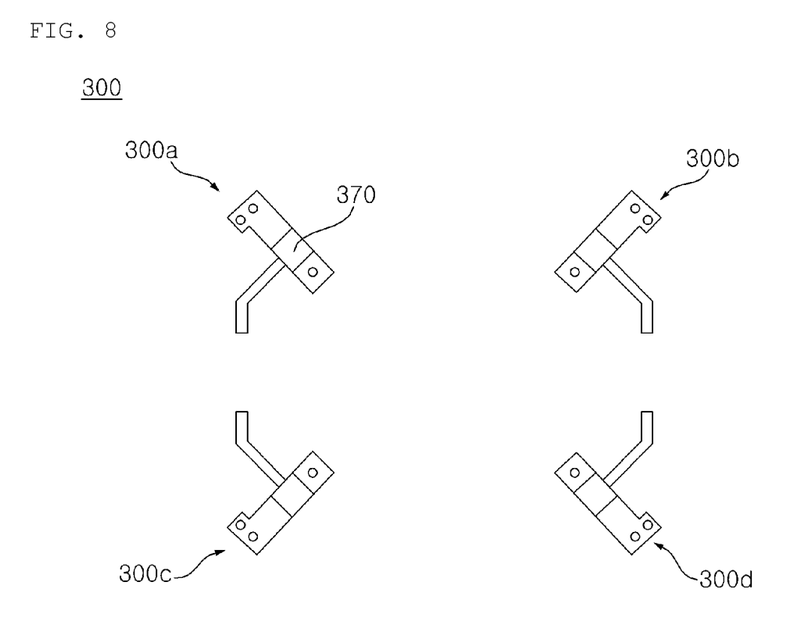
FIG. 8 is a front view of a sensor bar according to another embodiment of the present disclosure.
Figure 9:
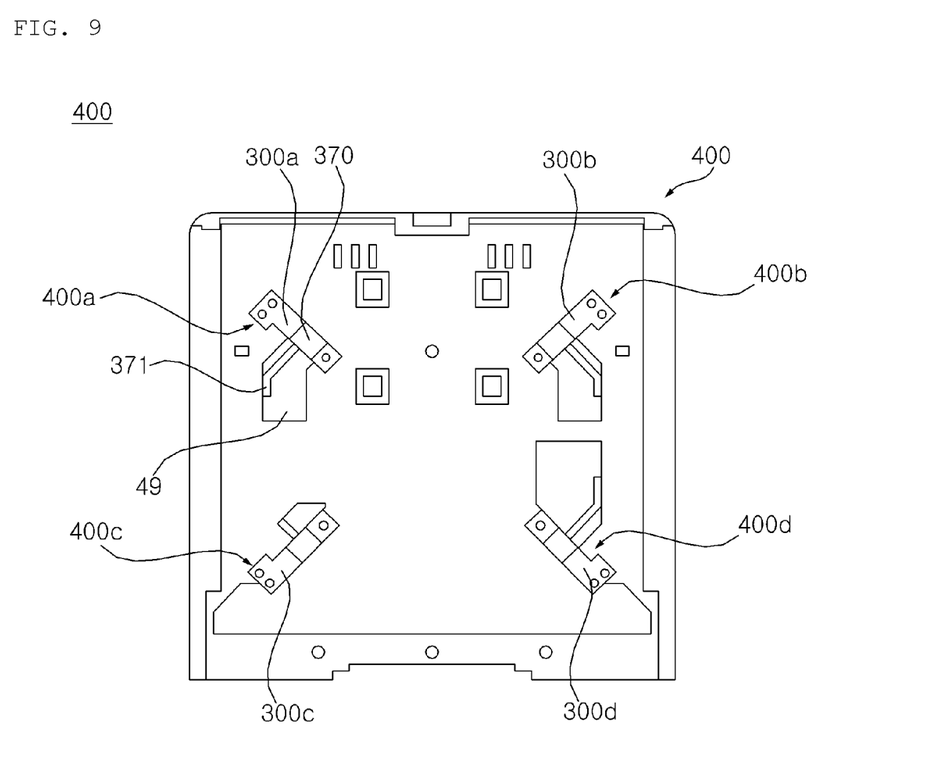
FIG. 9 is a front view of a main frame to which a sensor bar according to another embodiment of the present disclosure is coupled.

A display apparatus according to a second embodiment of the present disclosure is illustrated in FIGS. 8 and 9.

In the display apparatus according to the second exemplary embodiment of the present disclosure, four sensor bars each having a sensor rod may be formed to be spaced apart from each other and may be disposed to be inclined from the center toward the edge of a main frame 400.

That is, the second embodiment of the present disclosure shows that sensor bars of the first embodiment are provided with sensor rods without stem rods. First to fourth sensor bars 300a, 300b, 300c, and 300d are vertically and horizontally symmetrical to each other. First to fourth recessions 400a, 400b, 400c, and 400d in which the first to fourth sensor bars 300a, 300b, 300c, and 300d are accommodated are formed in the main frame 400.

Detailed configurations of the sensors bars implemented in the second embodiment of the present disclosure are not different from those of the sensor rods implemented in the first embodiment, and thus, a further description will be omitted.

The scope of the present disclosure should be determined by reasonable interpretation of the appended claims, and all modifications within the equivalent scope of the present disclosure are included in the scope of the present disclosure.

DESCRIPTION OF REFERENCE NUMERALS

10: display panel 20: guide panel
21: boss 22: haptic module
30: force sensor module 30a, 30b: sensor bar
31, 32: first sensor rod 35: stem rod
37: strain gauge
311, 321: first fastening hole
312, 322: second fastening hole
313, 323: third fastening hole
351, 352: guide hole 40: main frame
41, 42: first upper and lower recessions
45: first stem recession
411, 421: first fastening aperture
451, 452: protrusion
50: back cover

The invention claimed is:

1. A display apparatus, comprising:
a display panel;

a guide panel coupled to a rear surface of the display panel;

a main frame coupled to the guide panel; and a force sensor module disposed between the guide panel and the main frame, wherein the force sensor module includes:
- a sensor bar including one or more sensor rods, the one or more sensor rods extending from a central portion of the main frame toward a peripheral portion of the main frame, and
- a strain gauge provided at each of the one or more sensor rods,
- wherein an inner end of each of the one or more sensor rods is fixed to the main frame,
- wherein an outer end of each of the one or more sensor rods is fixed to the guide panel, and
- wherein the main frame defines an opening at a position corresponding to the outer end of each of the one or more sensor rods, a fastening member passing through the opening to fasten each of the one or more sensor rods to the guide panel.

2. The display apparatus of claim 1,
wherein an upper portion of the sensor bar and a lower portion of the sensor bar are horizontally symmetrical with each other.

3. The display apparatus of claim 2,
wherein each of the upper portion of the sensor bar and the lower portion of the sensor bar extends in a diagonal direction.

4. The display apparatus of claim 1,
wherein the sensor bar includes a stem rod, and
wherein the one or more sensor rods extend outwardly from both ends of the stem rod.

5. The display apparatus of claim 4,
wherein the stem rod extends in a vertical or horizontal direction.

6. The display apparatus of claim 5,
wherein the sensor bar is a pair of sensor bars disposed to be vertically or horizontally symmetric to each other.

7. The display apparatus of claim 4,
wherein the main frame defines a stem recession into which the stem rod is inserted.

8. The display apparatus of claim 7,
wherein a guide hole is provided in one of the stem rod or the main frame, and
wherein a protrusion to be inserted into the guide hole is provided in the other one of the stem rod or the main frame.

9. The display apparatus according to claim 8,
wherein the outer end of each of the one or more sensor rods is spaced apart from a bottom surface of the main frame so as to be movable toward the main frame.

10. The display apparatus of claim 9,
wherein the guide panel provides a boss protruding in a rearward direction, and
wherein the outer end of each of the one or more sensor rods is fixed to the boss.

11. The display apparatus of claim 10,
wherein the fastening member passes through the opening to fasten each of the one or more sensor rods to the boss.

12. The display apparatus of claim 4,
wherein an angle formed between each of the one or more sensor rods and the stem rod is 100° to 150°.

13. The display apparatus of claim 1,
wherein the strain gauge is disposed at a point where deformation of each of the one or more sensor rods according to a pressure applied to the display panel is greatest.

14. The display apparatus of claim 1, further comprising:
at least one haptic module disposed at a rear surface of the guide panel and configured to provide haptic effects to the display panel,
wherein the sensor bar overlaps with a portion of the at least one haptic module.

15. The display apparatus of claim 14, further comprising:
a processor electrically connected to the display panel,
wherein the display panel is configured to convert a pressure applied to the display panel into an electrical signal and provide, to the processor, the electrical signal.

16. The display apparatus of claim 15, wherein the haptic module includes a haptic actuator, and
wherein the haptic actuator is configured to provide, based on the electrical signal, the haptic effects to the display panel.

17. The display apparatus of claim 16, further comprising:
a printed circuit board (PCB) panel disposed at the main frame, and
wherein the strain gauge includes a signal transmitter configured to transmit, to the PCB panel, an input sensed by the strain gauge.

18. The display apparatus of claim 17, wherein the signal transmitter includes at least one bent portion that varies based on a position of the strain gauge on each of the one or more sensor rods.

19. The display apparatus of claim 1,
wherein the strain gauge is disposed between the inner end and the outer end of each of the one or more sensor rods, and
wherein the strain gauge is positioned closer to the inner end of each of the one or more sensor rods than to the outer end of each of the one or more sensor rods.

* * * * *